US009898227B2

(12) United States Patent
Craddock et al.

(10) Patent No.: US 9,898,227 B2
(45) Date of Patent: Feb. 20, 2018

(54) SYNCHRONOUS INPUT/OUTPUT VIRTUALIZATION

(71) Applicant: INTERNATIONAL BUSINESS MACHINES CORPORATION, Armonk, NY (US)

(72) Inventors: David F. Craddock, New Paltz, NY (US); Beth A. Glendening, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 105 days.

(21) Appl. No.: 15/139,948

(22) Filed: Apr. 27, 2016

(65) Prior Publication Data

US 2017/0315754 A1    Nov. 2, 2017

(51) Int. Cl.
*G06F 3/06* (2006.01)
(52) U.S. Cl.
CPC .......... *G06F 3/0659* (2013.01); *G06F 3/0611* (2013.01); *G06F 3/0683* (2013.01)
(58) Field of Classification Search
None
See application file for complete search history.

(56) References Cited

U.S. PATENT DOCUMENTS

| | | |
|---|---|---|
| 4,470,115 A | 9/1984 | Wehr |
| 5,359,713 A | 10/1994 | Moran et al. |
| 5,410,655 A | 4/1995 | Greenfield et al. |
| 8,386,745 B2 | 2/2013 | Kegel et al. |
| 8,782,024 B2 | 7/2014 | Arndt et al. |
| 2004/0015755 A1 | 1/2004 | Klotz et al. |
| 2005/0204069 A1 | 9/2005 | Carlson et al. |
| 2005/0289505 A1 | 12/2005 | Williams |
| 2008/0187007 A1 | 8/2008 | Goyal et al. |
| 2009/0320021 A1 | 12/2009 | Pan et al. |
| 2011/0023027 A1 | 1/2011 | Kegel et al. |

(Continued)

FOREIGN PATENT DOCUMENTS

| | | |
|---|---|---|
| CA | 1272299 A1 | 7/1990 |
| WO | 2013081941 A1 | 6/2013 |

OTHER PUBLICATIONS

John Irwin, "Getting Started with DB2 Application Tuning," Search Data Center, Nov. 12, 2015, http://searchdatacenter.techtarget.com/tip/Getting-started-with-DB2-application-tuning, pp. 1-10.

(Continued)

*Primary Examiner* — Kevin Vergrugge
(74) *Attorney, Agent, or Firm* — Cantor Colburn LLP; Steven Chiu

(57) ABSTRACT

Technical solutions are described for executing a plurality of computer-executable synchronous input/output (I/O) commands received by a storage control unit in a multiple virtual storage system. An example method includes receiving a set of synchronous I/O commands, each of the commands received from a respective operating system from a plurality of operating systems. The method further includes selecting, from the set of synchronous I/O operations, a subset of synchronous I/O commands, and allocating a shared resource to the subset of synchronous I/O commands. The method further includes executing each synchronous I/O command from the selected subset of synchronous I/O commands concurrently.

20 Claims, 10 Drawing Sheets

(56) References Cited

U.S. PATENT DOCUMENTS

2011/0196996 A1    8/2011  Goyal
2012/0054381 A1    3/2012  Craddock et al.
2012/0159039 A1    6/2012  Kegel et al.
2013/0246666 A1    9/2013  Vemuri et al.
2015/0234612 A1    8/2015  Himelstein et al.

OTHER PUBLICATIONS

Princeton University, "Enterprise Servers and Storage," Solaris Troubleshooting and Performance Tuning, 2011, pp. 1-11.

SYNCHRONOUS INPUT/OUTPUT VIRTUALIZATION

The present application relates generally to input/output (I/O) on a multiple virtual storage (MVS), and more specifically, to improving execution of synchronous I/O operations from multiple operating systems accessing the MVS.

BACKGROUND

In general, the technical field discussed herein includes communications between servers and storage control units over a storage area network (SAN) involving multiple switches and multiple layers of a protocol stack. Contemporary implementations of these communications between servers and storage control units include asynchronous access operations by operating systems within the SAN. Asynchronous access operations require queues and schedulers for initiating the requests, along with interruptions for any associated context switch for processing a completion status. The queues, schedulers, and interruptions result in asynchronous overhead that adds significant latency and processing delays across the SAN.

A SAN, as described by the Storage Networking Industry Association (SNIA), is a high performance network that facilitates storage devices and computer systems to communicate with each other. In large enterprises, multiple computer systems or servers have access to multiple storage control units within the SAN. Typical connections between the servers and control units use technologies such as Ethernet or Fibre-Channel, with associated switches, I/O adapters, device drivers and multiple layers of a protocol stack. Fibre-channel, for example, as defined by the INCITS T11 Committee, defines physical and link layers FC0, FC1, FC2 and FC-4 transport layers such as the Fibre Channel Protocol (FCP) for SCSI and FC-SB-3 for Fibre Connectivity (FICON).

Synchronous I/O causes a software thread to be blocked while waiting for the I/O to complete, but avoids context switches and interrupts. Synchronous I/O works well when the I/O is locally attached with minimal access latency, but as access times increase, the non-productive processor overhead of waiting for the I/O to complete becomes unacceptable for large multi-processing servers. Hence, server access to SAN storage generally uses asynchronous I/O access techniques, due to the large variation in access times, and even the minimum access times of the SAN storage when using synchronous I/O access with the protocols such as Fibre-Channel.

SUMMARY

According to an embodiment, a computer-implemented method for executing a plurality of computer-executable synchronous input/output (I/O) commands in a multiple virtual storage system, includes receiving, by a processor, a set of synchronous I/O commands. The set of commands includes a plurality of synchronous I/O commands, each received from a respective operating system from a plurality of operating systems. The computer-implemented method also includes selecting, from the set of synchronous I/O commands, a subset of synchronous I/O commands. The computer-implemented method also includes allocating a shared resource to the subset of synchronous I/O commands. The computer-implemented method also includes executing, concurrently, each synchronous I/O command from the selected subset of synchronous I/O commands.

According to another embodiment, a computer program product facilitates executing a plurality of computer-executable synchronous input/output (I/O) commands in a multiple virtual storage system. The computer program product includes a computer readable storage medium having program instructions executable by a processor. The program instructions include instructions to receive a set of synchronous I/O commands that includes the plurality of synchronous I/O commands, each received from a respective operating system from a plurality of operating systems. The program instructions also includes instructions to select, from the set of synchronous I/O commands, a subset of synchronous I/O commands, where the subset of synchronous I/O commands includes a predetermined number of synchronous I/O commands to be executed concurrently. The program instructions also includes instructions to allocate a shared resource to the subset of synchronous I/O commands. The program instructions also includes instructions to execute, concurrently, each synchronous I/O command from the selected subset of synchronous I/O commands.

According to another embodiment, a system for managing execution of a plurality of computer-executable synchronous input/output (I/O) commands includes a memory and a processor communicably coupled with the memory. The processor receives a set of synchronous I/O commands that includes the plurality of synchronous I/O commands, each received from a respective operating system from a plurality of operating systems. The processor also selects, from the set of synchronous I/O commands, a subset of synchronous I/O commands, where the subset of synchronous I/O commands includes a predetermined number of synchronous I/O commands to be executed concurrently. The processor also allocates a shared resource to the subset of synchronous I/O commands. The processor also executes, concurrently, each synchronous I/O command from the selected subset of synchronous i/o commands.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
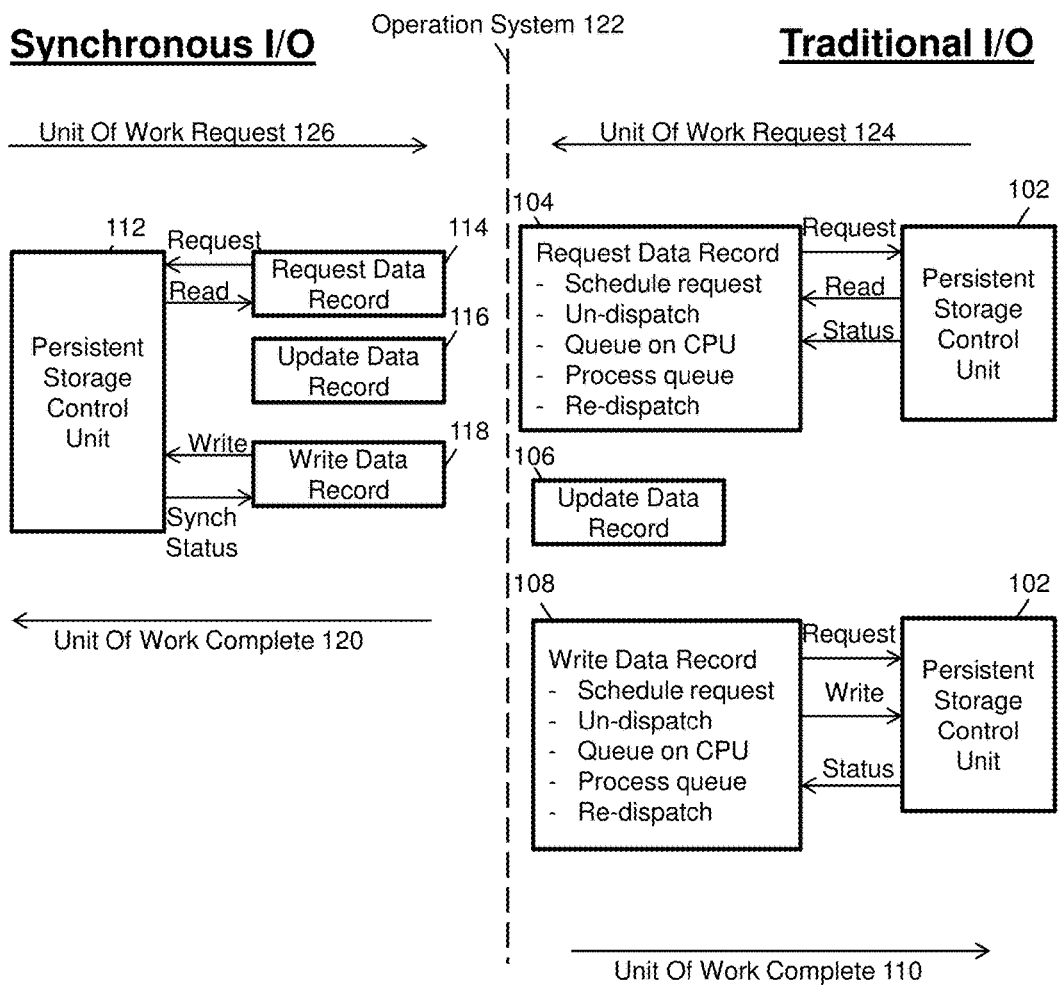
FIG. 1 illustrates a communication schematic comparing synchronous input/output (I/O) and traditional I/O in accordance with an embodiment.

In view of the above, technical solutions disclosed herein may include a synchronous system, method, and/or computer program product (herein synchronous system) that concurrently executes multiple synchronous I/O operations, each from a respective operating system, for efficient workload management.

The technical solutions described herein further improve a synchronous input/output (I/O) central processing unit (CPU) that receives synchronous read and write I/O operations from multiple operating systems, or the initiation of an I/O operation and subsequent synchronous test for completion. For example enterprise servers, which may use MVS, may attempt to share I/O adapters. The technical solutions described herein facilitate the MVS to facilitate enterprise servers, which may execute different operating systems and applications, to share I/O adapters to provide virtualization and sharing of such adapters even in case the enterprise servers use synchronous I/O access. For example, the MVS may implement a firmware-based approach with minimal over-head and large scalability for access to shared hardware resources.

The system, for example, uses a synchronous low latency protocol running over an interface link such as peripheral component interconnect express (PCIe) to communicate directly between a processor (also referred to herein as a server) and a storage subsystem. The storage subsystem receives mailbox commands, delivered from the CPU over the PCIe link, that request the synchronous execution of read/write commands. In the context of the technical solutions described herein, a mailbox is a named, logical queue of ordered messages that is maintained by a cross-system coupling facility to hold messages that have been sent to a dispatched unit but have not yet been received by that dispatcher unit. Should the message not be delivered or received as expected, the original sender receives return and reason codes from several sources, including the cross-system coupling facility and the receiver. A command that is associated with accessing and/or operating on one or more of the mailboxes may be referred to as a mailbox command.

For example, in a read command, if the data is not already in the control unit cache the synchronous command ends unsuccessfully. The control unit may initiate processing to asynchronously read the data into the control unit cache so that it can be read via traditional I/O processing. If the data was in the cache, the data may be transferred to the host memory and the synchronous I/O CPU instruction completes successfully. Write operations can transfer data from host memory to the control unit cache of one or more nodes within the control unit.

Embodiments of synchronous I/O described herein when compared to traditional I/O may be utilized to eliminate the overhead associated with a dispatcher, improve transactional latency, preserve contents of L1 and L2 cache by eliminating a context switch, and can reduce lock contention on data by reducing latency.

Described herein is a dynamic I/O paradigm for storage that can perform both synchronous and asynchronous (or traditional) processing from the application/middleware point of view. When applied to middleware, such as DB2® from IBM®, this new paradigm can result in faster performance. Current versions of DB2 can only have one I/O operation writing to the log at any one time. This single threaded process is highly dependent on the latency of these log write commands for the total throughput that can be accommodated for processing transactions. Embodiments of the synchronous I/O paradigm described herein can reduce the amount of time that it takes to write to the log. Note, that multi-write technology (e.g., zHyperWrite® technology produced by IBM) provides a way of eliminating the latency required by synchronous replication of data. The combination of embodiments described herein with the use of multi-write technology can provide the ability to maintain continuous availability with multi-switch technology (e.g., HyperSwap technology produced by IBM) while getting the benefits of synchronous I/O.

The workloads that run on the z/OS® (an OS from IBM) can typically see very high cache hit ratios (e.g., 90 percent) for read operations. This means that a high percent of the time the data is found in a dynamic random access memory (DRAM) cache in the storage subsystem (e.g., a persistent storage control unit), resulting in reduced I/O service times. These high cache hit ratios can be the result of a long tradition of close integration of the I/O stack from the applications ability to pass cache hints on I/O operations through optimized caching algorithms in the storage subsystem. When the data required for a read request is in DRAM in the storage subsystem it is amenable to being transferred to the host with the new synchronous I/O paradigm. If a cache miss occurs, the storage subsystem can initiate the process to bring the data into cache but synchronously notify the host to execute the I/O operation using the traditional asynchronous model.

Utilizing embodiments described herein to avoid the un-dispatching and re-dispatching of critical applications and middleware, can lead to a reduction in OS overhead and eliminate the L1 and L2 cache damage that can occur when a context switch occurs for a different application. Reducing the L1 and L2 cache damage and re-dispatching of work can lead to a significant reduction in CPU cost.

When embodiments are applied to DB2 executing on a z/OS platform, utilizing embodiments to accelerate read I/O and database logging can reduce DB2 transactional latency and accelerate transaction processing on the z/OS platform.

In addition, improving database log throughput can reduce cost by requiring fewer data sharing instances (LPARs, I/O connections, log devices) to achieve the workload requirements. It can also avoid forcing clients to re-engineer the workloads in order to avoid hitting constraints.

Turning now to FIG. 1, communication schematics 100 of a traditional I/O and a synchronous I/O when updating data stored on a peripheral storage device are generally shown in accordance with embodiments. As shown on the right side of FIG. 1, performing traditional I/O operations includes receiving a unit of work request 124 at an operating system (OS) 122 in a logical partition (LPAR). The unit of work can be submitted, for example, from an application or middleware that is requesting an I/O operation. As used herein the term "unit of work" refers to dispatchable tasks or threads.

In response to receiving the unit of work request, the OS 122 performs the processing shown in block 104 to request a data record. This processing includes scheduling an I/O request by placing the I/O request on a queue for the persistent storage control unit (CU) 102 that contains the requested data record, and then un-dispatching the unit of work. Alternatively, the application (or middleware) can receive control back after the I/O request is scheduled to possibly perform other processing, but eventually the application (or middleware) relinquishes control of the processor to allow other units of work to be dispatched and the application (or middleware) waits for the I/O to complete and to be notified when the data transfer has completed with or without errors.

When the persistent storage control unit (SCU) 102 that contains the data record is available for use and conditions permit, the I/O request is started by the OS issuing a start sub-channel instruction or other instruction appropriate for the I/O architecture. The channel subsystem validates the I/O request, places the request on a queue, selects a channel (link) to the persistent SCU 102, and when conditions permit begins execution. The I/O request is sent to a persistent SCU 102, and the persistent SCU 102 reads the requested data record from a storage device(s) of the persistent SCU 102. The read data record along with a completion status message is sent from the persistent SCU 102 to the OS 122. Once the completion status message (e.g., via an I/O interrupt message) is received by the OS 122, the OS 122 requests that the unit of work be re-dispatched by adding the unit of work to the dispatch queue. This includes re-dispatching the LPAR to process the interrupt and retrieving, by the I/O supervisor in the OS, the status and scheduling the application (or middleware) to resume processing. When the unit of work reaches the top of the dispatch queue, the unit of work is re-dispatched.

Still referring to the traditional I/O, once the data record is received by the OS 122, the OS 122 performs the processing in block 106 to update the data record that was received from the persistent SCU 102. At block 108, the updated data record is written to the persistent SCU 102. As shown in FIG. 1, this includes the OS 122 scheduling an I/O request and then un-dispatching the instruction. The I/O request is sent to a persistent SCU 102, and the persistent SCU 102 writes the data record to a storage device(s) of the persistent SCU 102. A completion status message (e.g., an interruption message) is sent from the persistent SCU 102 to the OS 122. Once the completion status message is received by the OS 122, the OS 122 requests that the unit of work be re-dispatched by adding the unit of work to the dispatch queue. When the unit of work reaches the top of the dispatch queue, the unit of work is re-dispatched. At this point, the unit of work is complete. As shown in FIG. 1, the OS 122 can perform other tasks, or multi-task, while waiting for the I/O request to be serviced by the persistent SCU 102.

The traditional I/O process is contrasted with a synchronous I/O process. As shown in FIG. 1, performing a synchronous I/O includes receiving a unit of work request at the OS 122. In response to receiving the unit of work request, the OS 122 performs the processing shown in block 114 which includes synchronously requesting a data record from the persistent SCU 112 and waiting until the requested data record is received from the persistent SCU 112. Once the data record is received by the OS 122, the OS 122 performs the processing in block 116 to update the data record. At block 118, the updated data record is synchronously written to the persistent SCU 112. A synchronous status message is sent from the persistent SCU 112 to the OS 122 to indicate the data has been successfully written. At this point, the unit of work is complete. As shown in FIG. 1, the OS 122 is waiting for the I/O request to be serviced by the persistent SCU 112 and is not performing other tasks, or multi-tasking, while waiting for the I/O request to be serviced. Thus, in an embodiment, the unit of work remains active (i.e., it is not un-dispatched and re-dispatched) until the OS 122 is notified that the I/O request is completed (e.g., data has been read from persistent SCU, data has been written to persistent SCU, error condition has been detected, and the like).

Thus, as shown in FIG. 1, synchronous I/O provides an interface between a server and a persistent SCU that has sufficiently low overhead to allow an OS to synchronously read or write one or more data records. In addition to the low overhead protocol of the link, an OS executing on the server can avoid the scheduling and interruption overhead by using a synchronous command to read or write one or more data records. Thus, embodiments of synchronous I/O as described herein when compared to traditional I/O not only reduce the wait time for receiving data from a persistent SCU, they also eliminate steps taken by a server to service the I/O request. Steps that are eliminated can include the un-dispatching and re-dispatching of a unit of work both when a request to read data is sent to the persistent SCU and when a request to write data is sent to the persistent SCU. This also provides benefits in avoiding pollution of the processor cache that would be caused by un-dispatching and re-dispatching of work.

As used herein, the term "persistent storage control unit" or "persistent SCU" refers to a storage area network (SAN) attached storage subsystem with a media that will store data that can be accessed after a power failure. As known in the art, persistent SCUs are utilized to provide secure data storage even in the event of a system failure. Persistent SCUs can also provide backup and replication to avoid data loss. A single persistent SCU is typically attached to a SAN and accessible by multiple processors.

As used herein, the term "synchronous I/O" refers to a CPU synchronous command that is used to read or write one or more data records, such that when the command completes successfully, the one or more data records are guaranteed to have been transferred to or from the persistent storage control unit into host processor memory.

Figure 2:
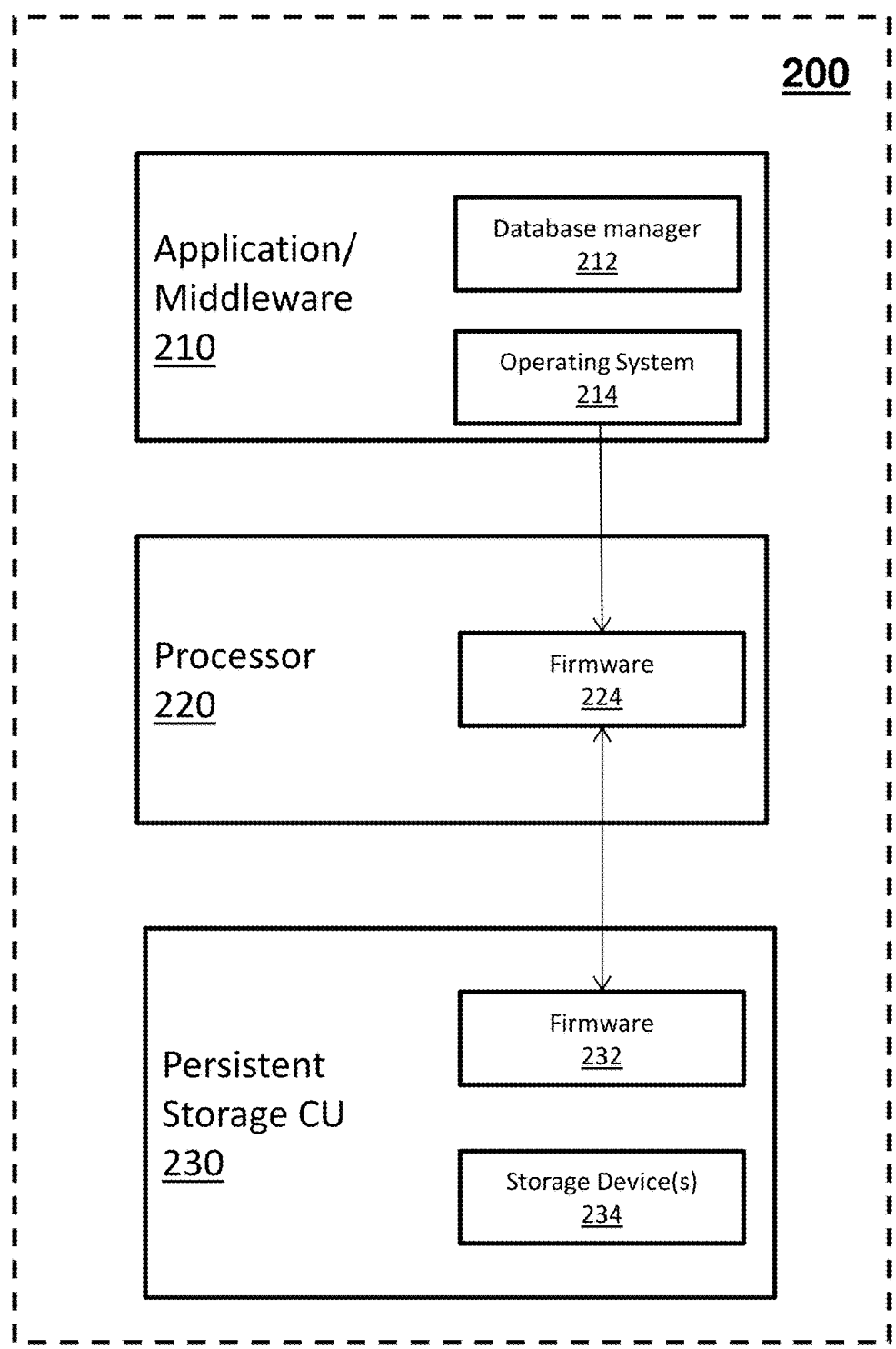
FIG. 2 illustrates a block diagram of a system for performing synchronous I/O in accordance with an embodiment.

Turning now to FIG. 2, a block diagram of a system 200 (e.g., synchronous system) for performing synchronous I/O is generally shown in accordance with an embodiment. The system 200 shown in FIG. 2 includes one or more application/middleware 210, one or more physical processors 220, and one or more persistent SCUs 230. The application/middleware 210 can include any application software that requires access to data located on the persistent SCU 230 such as, but not limited to a relational database manager 212 (e.g. DB2®), an OS 214, a filesystem (e.g., z/OS Distributed File Service System, z File System produced by IBM), a hierarchical database manager (e.g. IMS® produced by IBM), or an access method used by applications (e.g. virtual storage access method, queued sequential access method, basic sequential access method). As shown in FIG. 2, the database manager 212 can communicate with an OS 214 to communicate a unit of work request that requires access to the persistent SCU 230. The OS 214 receives the unit of work request and communicates with firmware 224 located on the processor 220 to request a data record from the persistent SCU 230, to receive the data record from the persistent SCU 230, to update the received data record, to request the persistent SCU 230 to write the updated data record, and to receive a confirmation that the updated data recorded was successfully written to the persistent SCU 230. The firmware 224 accepts the synchronous requests from the OS 214 and processes them. Firmware 232 located on the persistent SCU 230 communicates with the firmware 224 located on the processor 220 to service the requests from the processor 220 in a synchronous manner.

As used herein, the term "firmware" refers to privileged code executing on a processor that interfaces with the hardware used for the I/O communications; a hypervisor; and/or other OS software.

Embodiments described herein utilize peripheral component interconnect express (PCIe) as an example of a low latency I/O interface that may be implemented by embodiments. Other low latency I/O interfaces, such as, but not limited to Infiniband™ as defined by the InfiniBand Trade Association and zSystems coupling links can also be implemented by embodiments.

Figure 3:
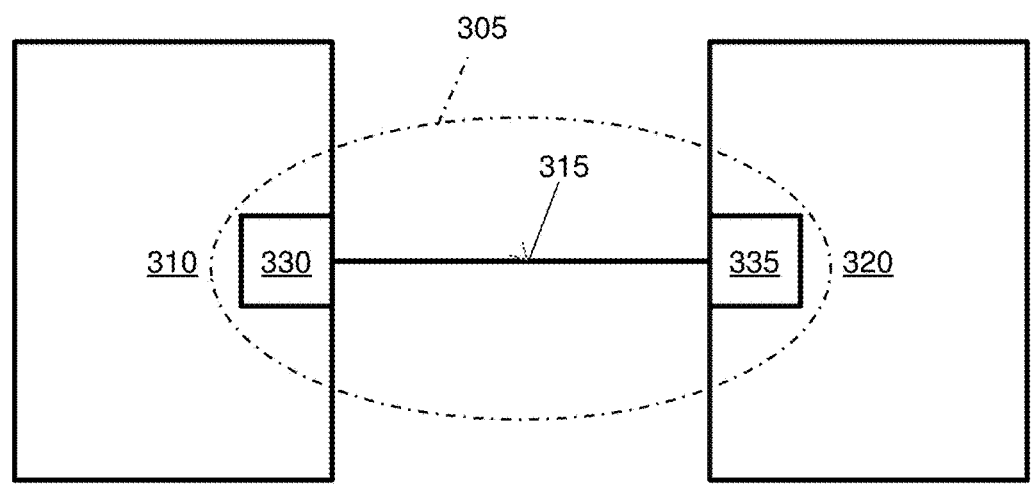
FIG. 3 illustrates a block diagram of an environment including a synchronous I/O link interface in accordance with an embodiment.

Turning now to FIG. 3, a block diagram of an environment 300 including a synchronous I/O link interface 305 is depicted in accordance with an embodiment. As shown in FIG. 3, the environment 300 utilizes the synchronous I/O link interface 305 as an interface between a server 310 and a persistent SCU 320. The synchronous I/O link interface 305 has sufficiently low latency and protocol overhead to allow an OS of the server 310 to synchronously read or write one or more data records from the persistent SCU 320. In addition to the low protocol overhead of the link, the OS can avoid the overhead associated with scheduling and interrupts by using a synchronous command via the synchronous I/O link interface 305 to read or write one or more data records. The synchronous I/O link interface 305, for example, can be provided as an optical interface based on any PCIe base specification (as defined by the PCI-SIG) using the transaction, data link, and physical layers. The synchronous I/O link interface 305 may further include replay buffers and acknowledgement credits to sustain full bandwidth.

The server 310 is configured to provide at least one synchronous I/O link interface 305 having at least one synchronous I/O link 315 to allow connection to at least one persistent SCU (e.g., persistent SCU 320). It can be appreciated that two or more synchronous I/O links 315 may be required for each connection to a persistent SCU. It can also be appreciated that two or more synchronous I/O links 315 may support switch connections to a persistent SCU. In an exemplary embodiment, where PCIe is utilized, the server 310 comprises a PCIe root complex 330 for the interface link 315, while the persistent SCU 320 comprises a PCIe endpoint 335 for the control unit synchronous I/O interface 305.

Figure 4:
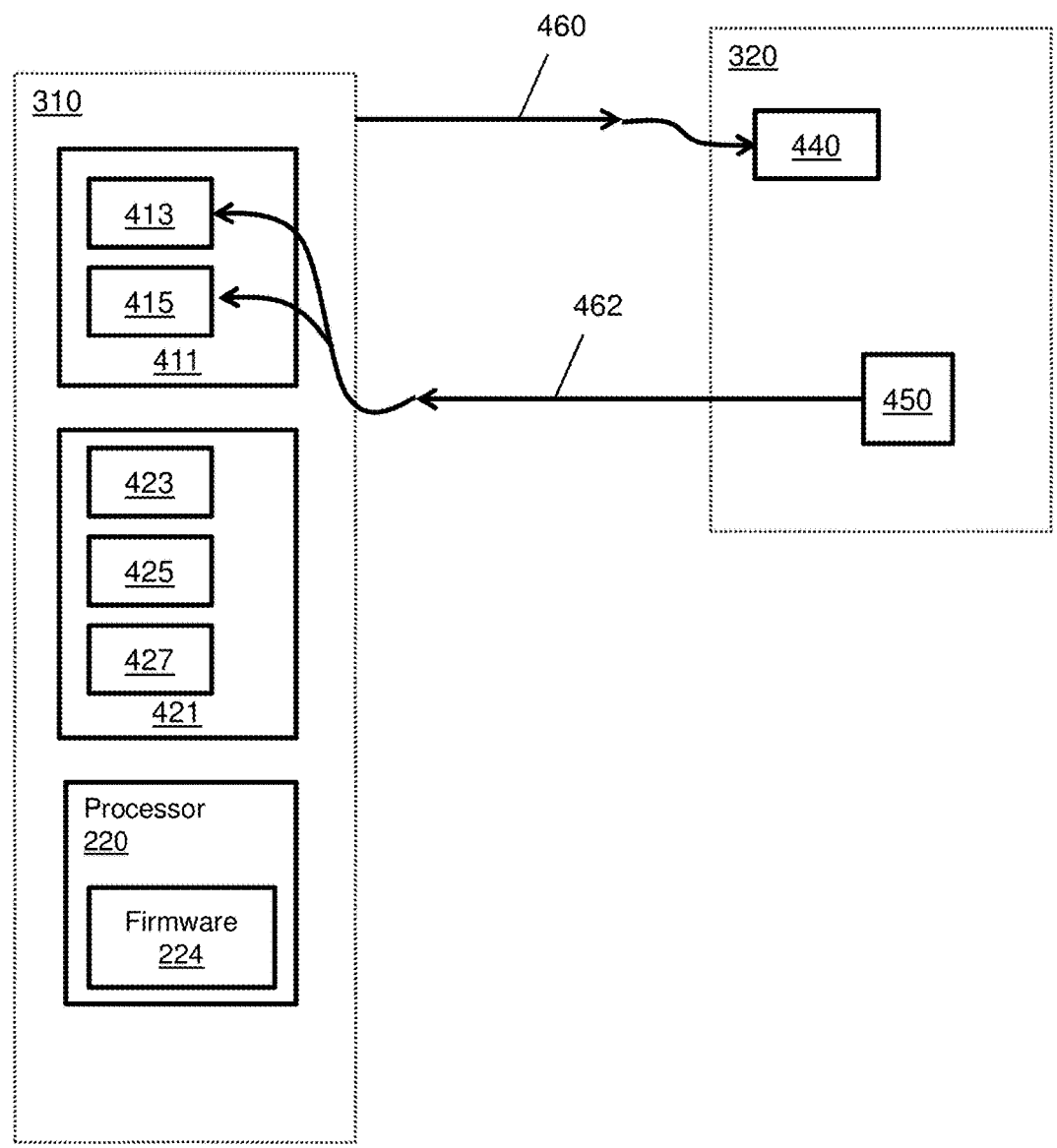
FIG. 4 illustrates a block diagram of an environment for performing synchronous I/O with respect to a mailbox command and read operation in accordance with an embodiment.

Turning now to FIG. 4, a block diagram of an environment 400 for performing synchronous I/O with respect to a mailbox command and read operation is depicted in accordance with an embodiment. As shown in FIG. 4, the environment 400 includes the server 310 (e.g., includes the application/middleware 210 and processor 220 illustrated in FIG. 2) and a persistent SCU 320 (e.g., includes persistent CU 230 illustrated in FIG. 2). The server 310 includes a LPAR 411 that may execute an operating system, and may include memory locations for a data record 413 and an associated suffix 415. The server 310 may further include a status area 421 comprising a device table 423 that includes one or more device table entries (DTE) and a status table 427 that includes one or more status pages. The status area 421 further may include I/O address translation table (IOAT) 425. The device table 423 and the IOAT table 427 are data structures used by the firmware 224 to store the mappings, such as, between virtual addresses and physical addresses, and the devices (SCUs) being accessed using the physical addresses. In addition, the status area 421 may include a function table entry (FTE), which is a data structure used by a function table to indicate access to a specified synchronous I/O link. The persistent SCU 320 includes at least one mailbox 440 and a data record 450. In an example, the status area 421 may be part of the LPAR 411.

In operation, synchronous I/O commands issued by the OS of the LPAR 411 are processed by the firmware 224 to build a mailbox command 460 that is forwarded to the persistent SCU 320. For example, upon processing a synchronization I/O command for the OS by the firmware 224 of the server 310, the firmware 224 prepares hardware of the server 310 and sends the mailbox command 460 to the persistent SCU 320. The mailbox command 460 is sent to the persistent SCU 320 in one or more memory write operations (e.g., over PCIe, using a PCIe base mailbox address that has been determined during an initialization sequence described below). A plurality of mailboxes can be supported by the persistent SCU 320 for each synchronous I/O link 305. A first mailbox location of the plurality of mailboxes can start at the base mailbox address, with each subsequent mailbox location sequentially located 256-bytes after each other. After the mailbox command 460 is sent, the firmware 224 polls the status area 421 (e.g., a status field 427) for completion or error responses. In embodiments, the status area 421 is located in privileged memory of the server 310 and is not accessible by the OS executing on the LPAR 411. The status area 421 is accessible by the firmware 224 on the server 310 and the firmware 224 can communicate selected contents (or information related to or based on contents) of the status area 421 to the OS (e.g., via a command response block).

In general, a single mailbox command 460 is issued to each mailbox at a time. A subsequent mailbox command will not issue to a mailbox 440 until a previous mailbox command to the mailbox 440 has completed or an error condition (such as a timeout, when the data is not in cache, error in the command request parameters, etc.) has been detected. Successive mailbox commands for a given mailbox 440 can be identified by a monotonically increasing sequence number. Mailboxes can be selected in any random order. The persistent SCU 320 polls all mailboxes for each synchronous I/O link 315 and can process the commands in one or more mailboxes in any order. In an embodiment, the persistent SCU 320 polls four mailboxes for each synchronous I/O link 315. Receipt of a new mailbox command with an incremented sequence number provides confirmation that the previous command has been completed (either successfully or in error by the server 310). In an embodiment, the sequence number is also used to determine an offset of the status area 421. The mailbox command can be of a format that includes 128-bytes. The mailbox command can be extended by an additional 64-bytes or more in order to transfer additional data records. In an embodiment, a bit in the mailbox command is set to indicate the absence or presence of the additional data records.

The mailbox command can further specify the type of data transfer operations, e.g., via an operation code. Data transfer operations include read data and write data operations. A read operation transfers one or more data records from the persistent SCU 320 to a memory of the server 310. A write operation transfers one or more data records from the memory of the server 310 to the persistent SCU 320. In embodiments, data transfer operations can also include requesting that the persistent SCU 320 return its World Wide Node Name (WWNN) to the firmware in the server. In further embodiments, data transfer operations can also request that diagnostic information be gathered and stored in the persistent SCU 320.

In any of the data transfer operations the contents of the mailbox command can be protected using a cyclic redundancy check (CRC) (e.g., a 32 bit CRC). In an embodiment, the mailbox command can be protected by a checksum. In an embodiment, if the persistent SCU 320 detects a checksum error, a response code to indicate the checksum error is returned. Continuing with FIG. 4, a synchronous I/O read data record operation will now be described. For instance, if a mailbox command 460 includes an operation code set to read, the persistent SCU 320 determines if the data record or records 450 are readily available, such that the data transfer can be initiated in a sufficiently small time to allow the read to complete synchronously. If the data record or records 450 are not readily available (or if any errors are detected with the mailbox command 460), a completion status is transferred back to the server 310. If the read data records are readily available, the persistent SCU 320 provides the data record 450.

In an embodiment, the persistent SCU 320 processes the mailbox command 460, fetches the data record 450, provides CRC protection, and transfers/provides the data record 450 over the synchronous I/O link 315. The persistent SCU 320 provides the data record 450 as sequential memory writes over PCIe, using the PCIe addresses provided in the mailbox command 460. Each data record may use either one or two PCIe addresses for the transfer as specified in the mailbox command 460. For example, if length fields in the mailbox command 460 indicate the data record is to be transferred in a single contiguous PCIe address range, only one starting PCIe address is used for each record, with each successive PCIe memory write using contiguous PCIe addresses. In embodiments, the length fields specify the length in bytes of each data record to be transferred.

The data record 450 can include a data portion and a suffix stored respectively on data record 413 and suffix 415 memory locations of the logical partition 411 after the data record 450 is provided. The data record 413 can be count key data (CKD) or extended count key data (ECKD). The data record 413 can also be utilized under small computer system interface (SCSI) standards, such as SCSI fixed block commands. Regarding the suffix, at the end of each data record 450, an additional 4-bytes can be transferred comprising a 32-bit CRC that has been accumulated for all the data in the data record 450. The metadata of the suffix 415 can be created by an operating system file system used for managing a data efficiently. This can be transferred in the last memory write transaction layer packet along with the last bytes of the data record 450, or in an additional memory write.

In addition, a host bridge of the server 310 performs address translation and protection checks (e.g., on the PCIe address used for the transfers) and provides an indication in the DTE 423 to the firmware 224 of the server 310 when the data read command 462 is complete. The host bridge can also validate that the received CRC matches the value accumulated on the data transferred. After the last data record and corresponding CRC have been initiated on the synchronous I/O link 315, the persistent SCU 320 considers the mailbox command 460 complete and is readied to accept a new command in this mailbox 440.

In an exemplary embodiment, the server 310 will consider the mailbox command 460 complete when all the data records 450 have been completely received and the corresponding CRC has been successfully validated. For example, the firmware 224 performs a check of the status area 421 to determine if the data read 462 was performed without error (e.g., determines if the DTE 423 indicates 'done' or 'error'). If the data read 462 was returned without error and is complete, the firmware then completes the synchronous I/O command. The server 310 will also consider the mailbox command 460 complete if an error is detected during the data read 462 or CRC checking process, error status is received from the persistent SCU 320, or the data read 462 does not complete within the timeout period for the read operation.

Embodiments of the mailbox command 460 can also include a channel image identifier that corresponds to a logical path previously initialized by the establish-logical-path procedure, for example over a fibre-channel interface. If the logical path has not been previously established, a response code corresponding to this condition can be written to the status area 421 to indicate that the logical path was not previously established.

The mailbox command block can also include a persistent SCU image identifier that corresponds to a logical path previously initialized by the establish-logical-path procedure. If the logical path has not been previously established, a response code corresponding to this condition can be written to the status area 421 to indicate that the logical path was not previously established.

The mailbox command block can also include a device address within the logical control unit (e.g., a specific portion of the direct access storage device located in the storage control unit) that indicates the address of the device to which the mailbox command is directed. The device address should be configured to the persistent SCU specified, otherwise the persistent SCU 320 can return a response code (e.g., to the status area 421 in the server 310) to indicate this condition.

The mailbox command block can also include a link token that is negotiated by the channel and the persistent SCU 320 each time the synchronous I/O link is initialized. If the persistent SCU 320 does not recognize the link token, it can return a value to the status area 421 that indicates this condition.

The mailbox command block can also include a WWNN that indicates the WWNN of the persistent SCU to which the command is addressed. In embodiments, it is defined to be the 64-bit IEEE registered name identifier as specified in the T11 Fibre-Channel Framing and Signaling 4 (FC-FS-4) document. If the specified WWNN does not match that of the receiving persistent SCU, then a response code indicating this condition is returned to the processor.

The mailbox command block can also include device specific information that is used to specify parameters specific to this command. For example, for enterprise disk attachment when a write or read is specified by the operation code, device specific information can include the prefix channel command. In another example, when the operation code specifies that the command is a diagnostic command, the device specific information can include a timestamp representing the time at which this command was initiated and a reason code.

The mailbox command can also include a record count that specifies the number of records to be transferred by this synchronous I/O command (or mailbox command). A synchronous I/O link is accessible by an OS using a unique function handle that is associated with a specific virtual function.

When PCIe is being utilized with a mailbox command that includes multiple 32 bit words, the mailbox command can include one or more PCIe data addresses in the following format: PCIe data address bits 63:32 in word "n" to specify the word-aligned address of the location in memory (e.g., in the processor) where data will be fetched for a write and stored for a read operation; and PCIe data addressing bits 31:2 in word "n+1". In addition word n+1 can include an end or record bit that can be set to indicate that the last word specified is the last word of the record that is to be read or written.

The mailbox command can also include a mailbox valid bit(s) that indicates whether the mailbox command is valid and whether the entire mailbox command has been received.

Figure 5:
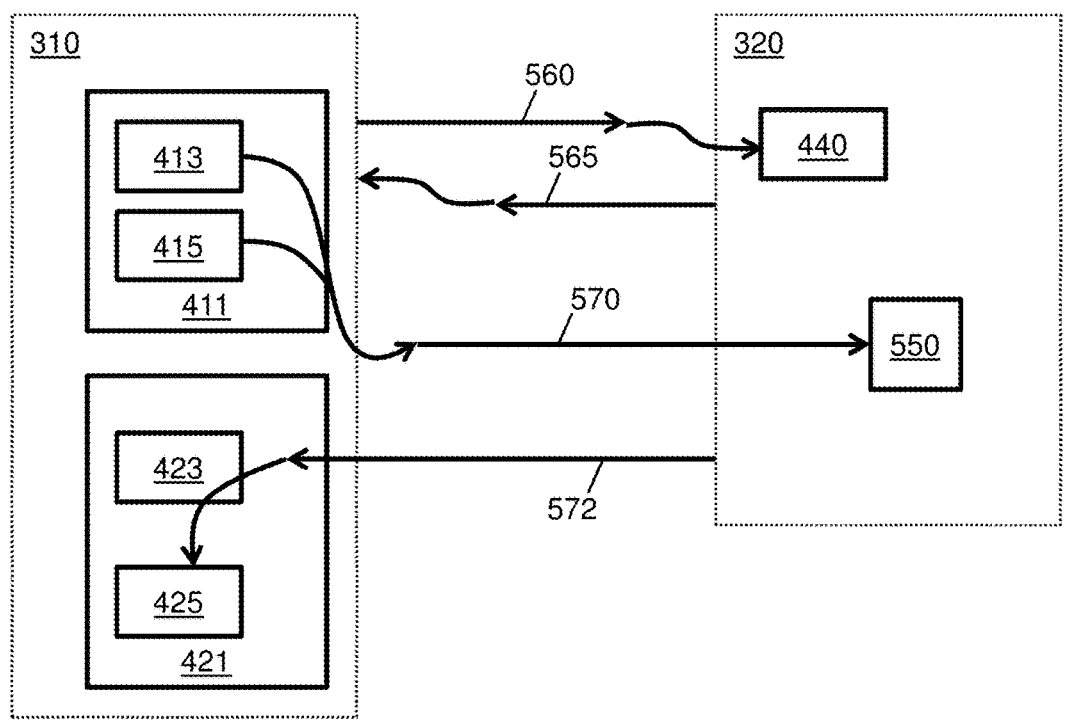
FIG. 5 illustrates a block diagram of an environment for performing synchronous I/O with respect to a write operation in accordance with an embodiment.

In view of the above, a synchronous I/O write data record operation will now be described with respect to FIG. 5 in accordance with an embodiment. As shown in FIG. 5, the environment 500 includes the server 310 and the persistent SCU 320. The server 310 includes the logical partition 411 comprising memory locations for the data record 413 and the suffix 415 and the status area 421 comprising the DTE 423 and the status field 427. The persistent SCU 320 includes at least one mailbox 440 and a data record 550 once written. Additional components are not illustrated to avoid repetition.

In operation, for example, upon processing a synchronization I/O command for the OS by a firmware of the server 310, the firmware prepares hardware of the server 310 and sends the mailbox command 560 to mailbox 540 of the persistent SCU 320. As noted above, a plurality of mailboxes can be supported by the persistent SCU 320 for each synchronous I/O link 315. Further, after the mailbox command 560 is sent, the firmware 224 polls the status area 421 (e.g., a status field 427) for completion or error responses.

If the mailbox command 560, issued to mailbox 440, includes an operation code set to write, the persistent SCU 320 determines if it is able to accept the transfer of the data record or records 550. If the persistent SCU 320 is not able to accept the transfer (or if any errors are detected with this mailbox command 560), a completion status is transferred back to the server 310. If the persistent SCU 320 is able to accept the transfer, the persistent SCU 320 issues memory read requests 565 for the data.

In an embodiment, the persistent SCU 320 processes the mailbox command 560 and issues a read request 565 over PCIe (using the PCIe addresses provided in the mailbox command 560) to fetch the data including the data record 413 and the suffix 415. In response to the read request 565, the host bridge of the server 310 performs address translation and protection checks on the PCIe addresses used for the transfers.

Further, the server 310 responds with memory read responses 570 to these requests. That is, read responses 570 are provided by the server 310 over the synchronous I/O link 305 to the persistent SCU 320 such that the data record 550 can be written. Each data record may require either one or two PCIe addresses for the transfer as specified in the mailbox command 560. For example, if the length fields in the mailbox command 560 indicate the entire record can be transferred using a single contiguous PCIe address range, only one starting PCIe address is required for each record, with each successive PCIe memory read request using contiguous PCIe addresses. At the end of each data record, the additional data (for example, 8-bytes) will be transferred consisting of the CRC (for example, 32-bit) that has been accumulated for all the data in the record and optionally a longitudinal redundancy check (LRC) or other protection data that has also been accumulated. The total number of bytes requested for each record can be greater than the length of the record (such as by 8-bytes) to include the CRC protection bytes and the additional data (such as 4-bytes long) for the LRC.

After the data and CRC/LRC protection bytes have been successfully received, the persistent SCU 320 responds by issuing a memory write 572 (e.g., of 8-bytes of data). The persistent SCU 320 considers this mailbox command 560 complete after initiating this status transfer and must be ready to accept a new command in this mailbox 540. The server 310 will consider the mailbox command 560 complete when the status transfer has been received. For example, the firmware performs a check of the status area 521 (e.g., determines if the DTE 523 indicates 'done' or 'error'). The server 310 will also consider the mailbox command 560 complete if an error is detected during the data transfer, error status is received from the persistent SCU 320, or the status is not received within the timeout period for this operation.

Figure 6:
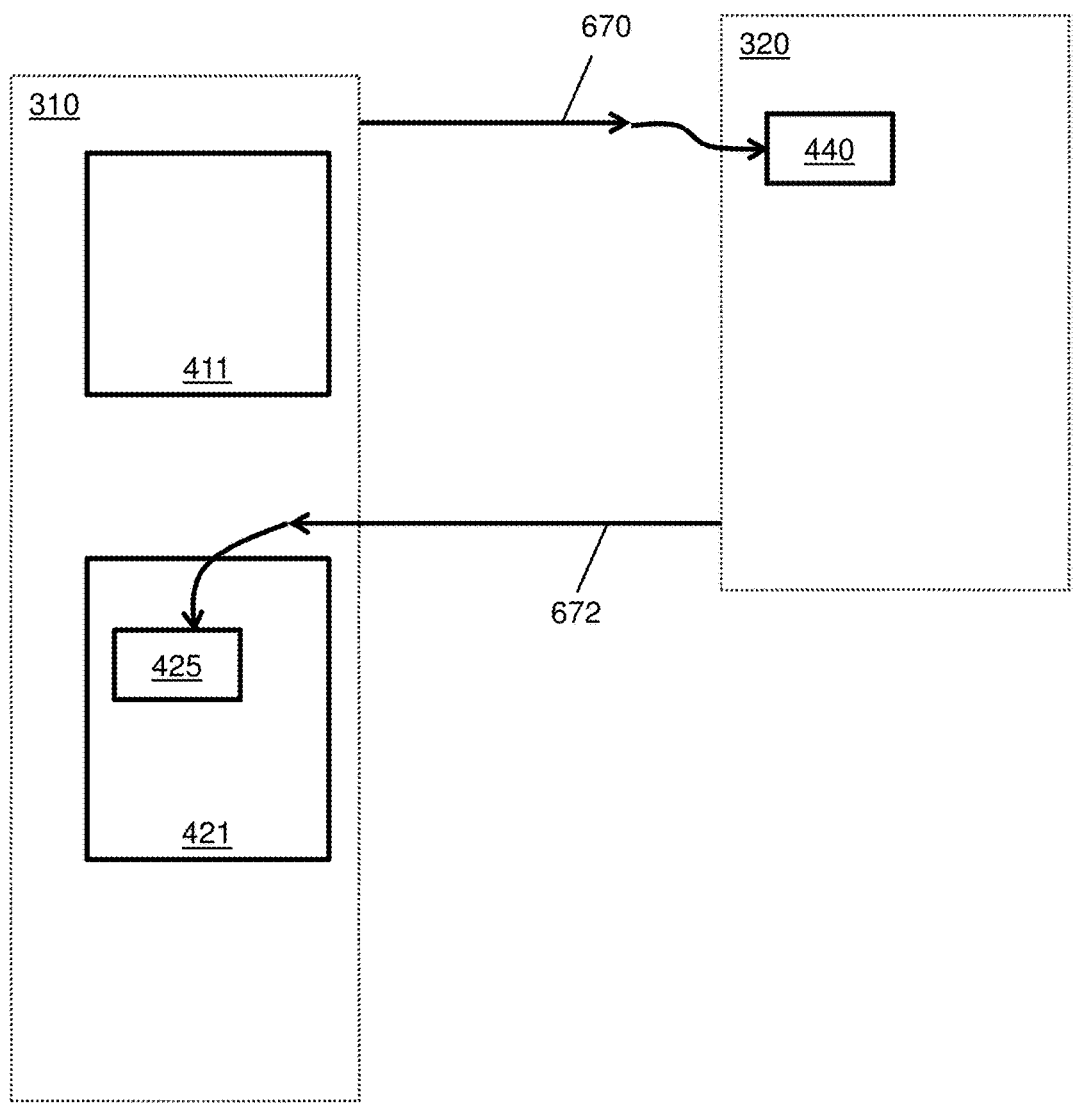
FIG. 6 illustrates a block diagram of an environment performing synchronous I/O with respect to a status operation in accordance with an embodiment.

FIG. 6 illustrates a block diagram of an environment 600 performing synchronous I/O with respect to a status operation in accordance with an embodiment. The status operation, for example, can be a completion status. As shown in FIG. 6, the environment 600 includes the server 310 and the persistent SCU 320. The server 310 includes a logical partition 411 and a status area 421 comprising one or more status fields 427. The persistent SCU 320 includes at least one mailbox 440.

In response to a status request 670, the completion status (as detected and recorded by the persistent SCU 320) is transferred 672 by the persistent SCU 320 to the server 310. In an embodiment where PCIe is utilized that status is transferred 672 to a 64-bit PCIe address that is offset from a status base address specified during an initialization exchange sequence. The status offset can be calculated as indicated in Equation 1.

$$\text{Offset} = (\text{Node\#} * 4096) + (\text{Mailbox\#} * 1024) + (\text{Sequence\#} * 256) \qquad \text{Equation 1}$$

In embodiments, when the persistent SCU 320 completes a read operation successfully, no status is written after the data transfer. The successful reception of the received data with valid CRC is an indication that the operation has completed successfully. In embodiments, when the persistent SCU 320 completes a write operation, the status is written after the write data has been successfully received. In embodiments, when the persistent SCU 320 completes a command other than a read operation or a write operation, or it is unable to complete a read or write operation successfully, it transfers 672 status information to the server.

In embodiments, the status information can include a bit(s) that indicates whether the status information is valid or invalid. The server 310 can poll on this bit(s) looking for it to indicate valid status information so that it knows that status information has been written.

The status information can also include an error status indicator that indicates whether the mailbox command completed successfully (e.g., write data was successfully written to the persistent SCU 320) or not (e.g., write of data was not successfully written to the persistent SCU 320). In the event that the mailbox command was not successfully completed, the status information provides additional details about the error that was encountered by the persistent SCU 320.

In the event of an error, the status information can include a record number that specifies the record (if any) to which the status information pertains.

In the event of an error, the status information can include a control unit response code that indicates the reason for the synchronous I/O operation failure. Response codes can include, but are not limited to indications that: device-dependent data (e.g., invalid track) is not valid, see response code qualifier for details; incorrect length (e.g., length of data does not match record length); SCU device address invalid; device-dependent error status presented (e.g., data record not available); logical path not established; persistent SCU synchronous I/O busy; read data not immediately available on persistent SCU; write data space not immediately available on persistent SCU; persistent SCU in recovery; checksum error; invalid operation code; sequence number does not match (e.g., mailbox command dropped); link token does not match (e.g., link re-initialized); WWNN does not match (e.g., link connection changed); and/or invalid length.

In the event of an error, the status information can include a persistent SCU response code qualifier whose value may include either an architected value or a model or device dependent value that further describes the condition specified by the response code.

In the event of an error, the status information can include a WWNN of the persistent SCU returning the status information.

In the event of an error, the status information can include a control unit timestamp that indicates when the status condition was detected.

In the event of an error, the status information can include a diagnostic information identifier that indicates that diagnostic information is available in the persistent SCU and can be uniquely identified by the value in this field.

In the event of an error, the status information can include device specific status.

Figure 7:
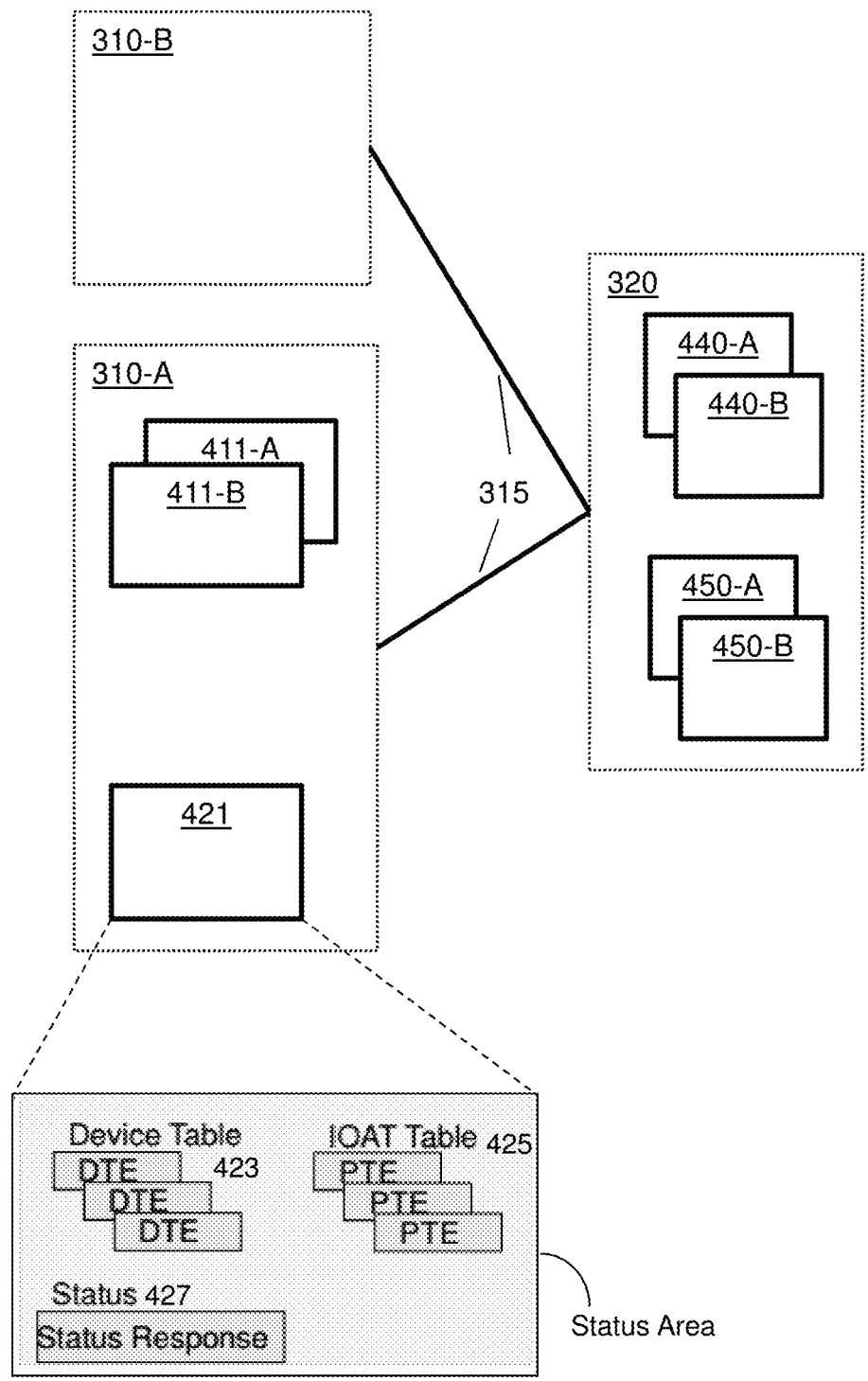
FIG. 7 illustrates a block diagram of an example environment for concurrent execution of synchronous I/O commands from separate operating systems.

FIG. 7 illustrates an example in which the SCU 320 is being accessed by multiple servers 310A and 310B. Each of the servers 310A and 310B are similar to the server 310 described herein. Thus, the server 310A includes one or more LPARs 411A-411B and the status area 421. Each of the LPARs 411A-411B operates a respective operating system, which may be distinct from each other. The status area 421 includes the device table 423, the IOAT table 425, and the status table 427. The data structures in the status area 421 may be shared across the operating systems of the LPARs 411A-411B. In an example, each LPAR may have a respective status area. The SCU 320 includes one or more mailboxes 440A-440B and one or more data records 450A-450B.

The operating systems of the LPARs 411A-411B, in response to an I/O operation, may issue a synchronous I/O command to access the data records 450A-450B on the persistent SCU 320. In response, the firmware 224 of the server 310 issues a mailbox command via the synchronous I/O link 315, as specified by the synchronous I/O command. The server 310 may also use the synchronous I/O link 315 for a mailbox command. Depending on the type of the mailbox command, the persistence SCU 320 operates as described herein. Of course, it is understood that although only two servers 310A and 310B are illustrated, the technical solutions described herein may be used in case of more or fewer number of servers.

Thus, for example, an enterprise server may use the persistent SCU 112 for synchronous I/O operations as described herein to have dynamic access via the low latency links 305 (such as PCI links), without impairing the access latency of another operating system from the multiple operating systems that may be executing on the enterprise server. To ensure that a first operating system is not affected by operations, or errors in a second operating system, the technical solutions described herein further facilitate full isolation between the operating systems, and in particular errors incurred by the first operating system cannot impair the access by the second operating system. The technical solutions described herein ensure such isolation by managing a pool of shared resources that the multiple operating systems may use. The shared resources may be part of the enterprise server, the SCU, and/or the link.

The technical solutions described herein facilitate controlling access to shared resources in both the server 310 and the SCU 320. For example, the pool of shared resources may include the shared physical link 315, the mailboxes 440A-440B in the SCU 320, the address translation and data protection data structures in the status area 421 (such as the device table, the IOAT table, and the status table). The system may have a different number of each of the shared resources. For example, the SCU 320 may include four mailboxes, whereas the server 310 may contain 1024 DTEs (or any other number of shared resources). Thus, one type of shared resource may have fewer instances than another type of shared resource. In order to minimize firmware access times of control structures, the device table entries used for address translation and protection in typical I/O infrastructures may be extended to also serve as data protection (CRC) context and also for control unit mailbox access controls.

The technical solutions described herein may facilitate the system firmware 224 to dynamically allocate one or more shared resources to a synchronous I/O command. The firmware 224 allocates the resources to maintain the isolation among the multiple operating systems of the respective LPARs 411A-411B. For example, the firmware 224 dedicates the shared resources associated with the mailbox command (such as modules updating the DTE, the IOAT table, the CRC computation context, and the mailbox access) to the single OS instance that issued the synchronous I/O command for the duration of that I/O command. After completion of the mailbox command the firmware 224 frees the shared resources to be available for a subsequent mailbox command for any OS with access to the shared link. Further, the technical solution described herein facilitate executing multiple mailbox commands maintaining the isolation among the multiple operating systems that issued the synchronous I/O commands that result in the mailbox commands.

For example, the multiple operating systems may initiate, substantially concurrently, multiple synchronous I/O commands. Each operating system has its own Function Handle for explicit access to a synchronous I/O link. A link is accessible by an operating system by using the function handle that is associated with a specific virtual function. The multiple synchronous I/O commands may specify a common synchronous I/O link to access the pertinent SCU 320. The server firmware 224 may initiate a mailbox command corresponding to each respective synchronous I/O command. For executing the mailbox command, the firmware 224 may allocate the data structures of the status area 421 of the server 310. Thus, the firmware allocates shared resources in the server, such as the DTEs and IOAT table entries, which provide address translation and protection and data integrity checking. In addition, the firmware 224 allocates the mailboxes 440A-440B of the SCU 320 for execution of the mailbox command. The firmware 224 also allocates the synchronous I/O link as requested by the synchronous I/O commands issued by the operating systems.

Figure 8:
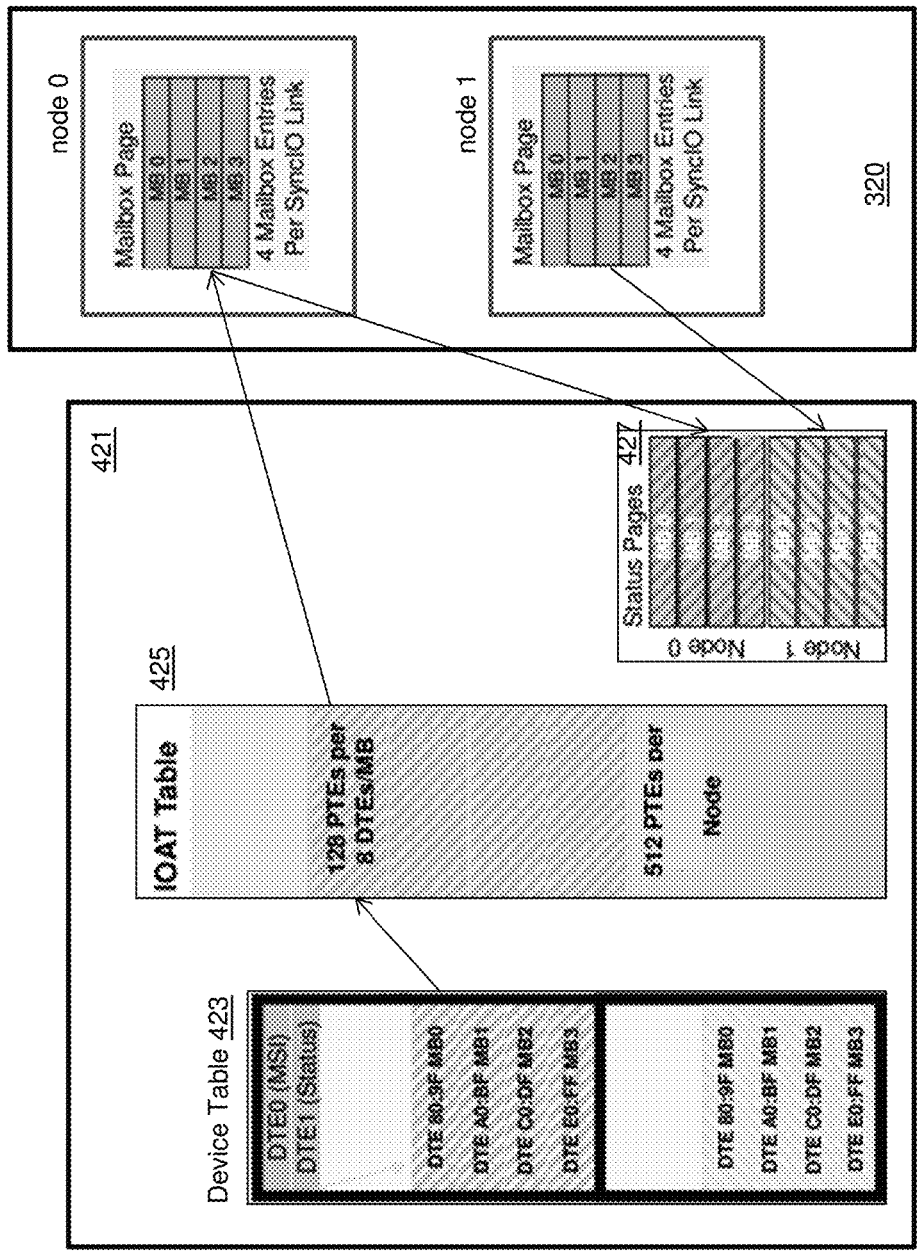
FIG. 8 illustrates a block diagram of example allocation of shared resources for concurrent execution of synchronous I/O commands from separate operating systems.
Figure 9:
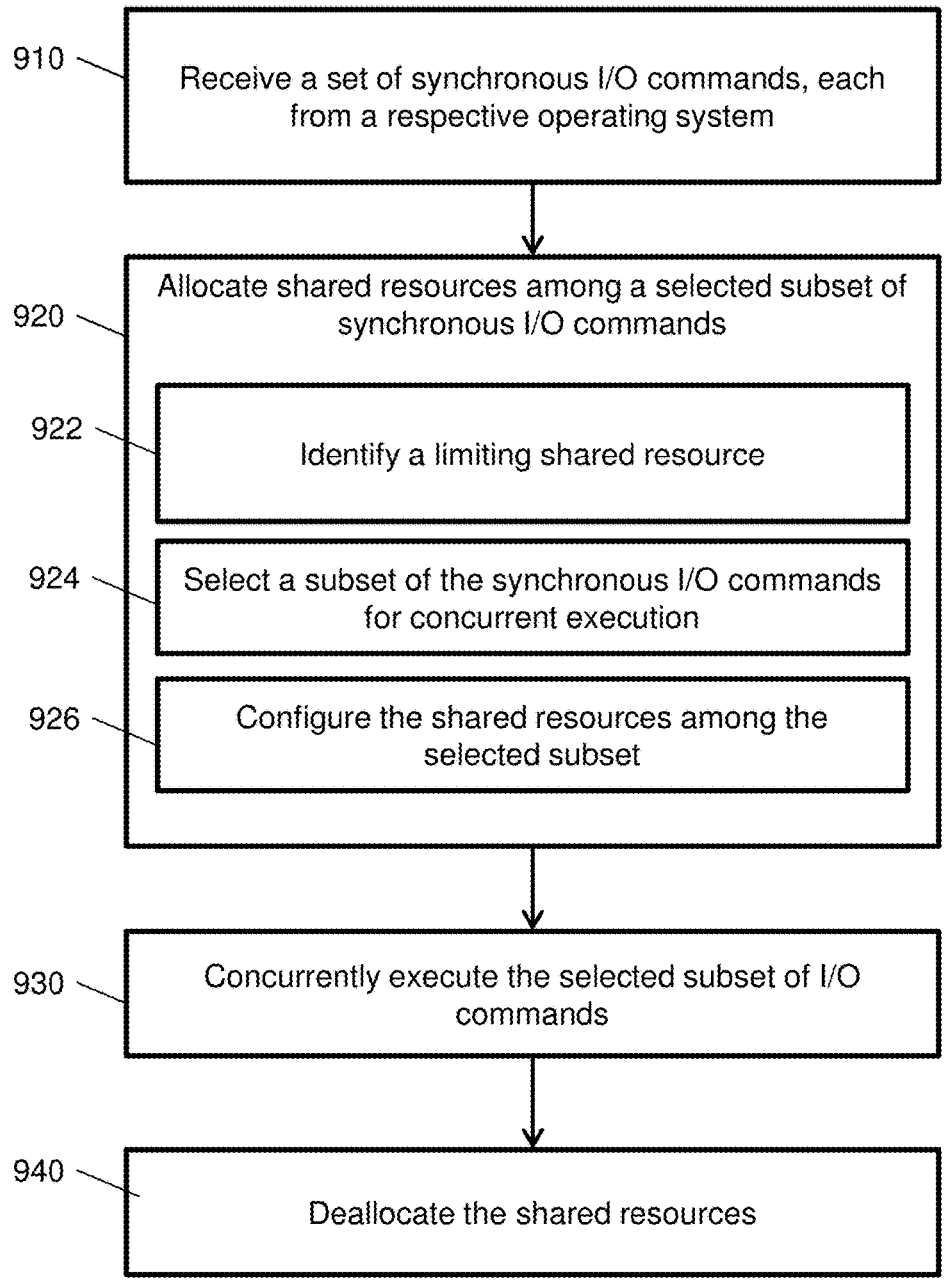
FIG. 9 illustrates an example process flow of allocation of shared resources for concurrent execution of synchronous I/O commands from separate operating systems.

FIG. 8 illustrates an example of allocation of the shared resources by the firmware 224 to a synchronous I/O command. FIG. 9 illustrates an example flowchart for allocating the shared resources to the synchronous I/O command. For example, the processor 220 receives one or more synchronous I/O commands from the one or more operating systems that may be executing on the one or more LPARs 411A-411B, respectively, as shown at block 910. The synchronous I/O commands may be distinct from each other. The firmware 224 initiates at least one mailbox command for each of the respective synchronous I/O commands. As described herein, for executing the mailbox commands, the firmware uses the shared resources, such as the synchronous I/O link 315, the device table 423, the IOAT table 425, and the status table 427. The firmware 224, using the technical specifications described herein, allocates the shared resources among a subset of the received synchronous I/O commands for facilitating concurrent execution of the selected subset of synchronous I/O commands, as shown at block 920. The selected subset of synchronous I/O commands may include more than one synchronous I/O commands from the received synchronous I/O commands such that each of the selected synchronous I/O commands is associated with the same synchronous I/O link 315.

For example, allocating the shared resources among the synchronous I/O commands includes identifying a limiting shared resource, as shown at block 922. For example, the resource that has the least number of instances, may be the limiting resource. For example, referring to the example system of FIG. 8, the system may include four mailboxes per synchronous I/O link and a status page corresponding to each mailbox 440. In an example, the status pages 427 may be divided into groups for each node in the persistent SCU 320. For example, the persistent SCU 320 may include one or more nodes, each node including a mailbox page, where a mailbox page is a collection of mailboxes. In the illustration, FIG. 8 depicts a persistent SCU 320 with two nodes, each including a mailbox page of four mailboxes each. Of course, other persistent SCUs, with different configuration than that illustrated, may be used. The server 310 may include multiple device table entries and IOAT table entries. Typically, the device table entries and the IOAT table entries outnumber the mailboxes. Thus, the mailboxes 440A-B is identified as the limiting resource.

Alternatively, or in addition, the firmware 224 may be preconfigured with the limiting resource. For example, the firmware 224 may be preprogrammed to identify the mailboxes 440A-B as the limiting resource. Of course, in other examples, some other resource may be identified as the limiting resource.

The firmware 224, based on the number of instances of the limiting resource (such as the mailboxes) selects a subset of the received synchronous I/O commands, as shown at block 924. For example, the firmware 224 may select the first X synchronous I/O commands from the received synchronous I/O commands, where X is the number of instances of the limiting resource. The firmware 224 may select the subset of synchronous I/O commands in any other manner, such as a randomized selection, selection of the last X, or any other selection technique. In addition, each of the synchronous I/O commands in the selected subset use the same common synchronous I/O link 315.

Further, the firmware 224 configures the shared resources for allocation among the selected subset of synchronous I/O commands, as shown at block 926. The shared resources are allocated based on the limiting resource. For example, the number of shared resources allocated may be multiples of the number of instances of the limiting resource. For example, the firmware 224 allocates a predetermined number of DTEs for execution of the selected subset of synchronous I/O commands. For example, the firmware 224 allocates a block of 8, 12, 16, 32, or any other number of DTEs for the selected subset of synchronous I/O commands. The first DTE in the allocated block may include the lock and toggle bit for the corresponding mailbox. The firmware may further allocate specific DTEs for the specific synchronous command by associating a DTE to a specific mailbox. For example, as shown in FIG. 8, the persistent SCU 320 has 8 mailboxes (2 mailbox pages each with 4 mailboxes), and the firmware 224 divides the allocated DTEs for the concurrent execution of the selected subset such that each mailbox has a corresponding DTE. In addition, the firmware 224 may allocate a predetermined number of IOAT table entries for the synchronous I/O command. For example, as illustrated in FIG. 8, the firmware 224 allocates 128 IOAT table entries per mailbox in the persistent SCU 320. Accordingly, the firmware 224 allocates 128 IOAT table entries for the first synchronous I/O command from the selected subset. Further, the firmware 224 allocates a predetermined number of the status pages for the first synchronous I/O command. For example, in the example illustrated in FIG. 8, each mailbox is allocated a specific status page.

Thus, in an example, the firmware 224 allocates a first mailbox to the first synchronous I/O command, and further allocates a predetermined number of DTEs, a predetermined number of IOAT table entries, and a status page associated with the first mailbox, to the first synchronous I/O command. In the same manner, the firmware 224 allocates a second mailbox to the second synchronous I/O command, and further allocates the predetermined number of DTEs, the predetermined number of IOAT table entries, and a status page associated with the second mailbox, to the second synchronous I/O command. The DTEs allocated to the first synchronous I/O command, and the DTEs allocated to the second synchronous I/O command are part of the same device table 423, and distinct from each other. The IOAT table entries allocated to the first synchronous I/O command, and the IOAT table entries allocated to the second synchronous I/O command are part of the same IOAT table 425, and distinct from each other. The firmware 224 may allocate resources to the first synchronous I/O command concurrently during allocation of the resources to the second synchronous I/O command. Here, concurrently indicates that the two resource allocation operations may be performed entirely or partially in parallel. Alternatively, the firmware 224 allocates the resources to the synchronous I/O commands sequentially, such as allocating the resources to the second synchronous I/O command after completing allocation of the resources to the first synchronous I/O command. Once the resources are allocated to a synchronous I/O command, the resources cannot be used by any other operations until the synchronous I/O command completes execution either successfully or in error.

In an example, the server 310 may share an IOAT table per 32 synchronous I/O links. The IOAT table may include 128K entries shared across the mailboxes from persistent SCUs connected via the synchronous I/O links. The firmware 224 may allocate 32 IOAT table entries (which may also be referred to as page table entries (PTE)) per synchronous I/O command.

Once the resources have been allocated, the firmware 224 proceeds to execute the synchronous I/O commands. For example, each of the selected subset of synchronous I/O commands are executed concurrently, as shown at block 930. Since each of the selected subset of synchronous I/O commands is allocated distinct parts of the shared resources, such as the device table 423, the IOAT table 425, the status table 427, and the mailboxes 440, and since each of the selected subset of synchronous I/O commands uses the same synchronous I/O link 315, the firmware 224 can execute the commands concurrently. The first synchronous I/O command of the selected subset of synchronous I/O commands does not rely on, and thus does not have to wait for completion of the second synchronous I/O command. Accordingly, the synchronous I/O commands can be executed concurrently. The synchronous I/O commands in the selected subset may not be from the same LPAR, and thus may be from different operating systems.

Once a synchronous I/O command completes execution (either successfully or in error), the firmware 224 deallocates the shared resources that were allocated to the command, as shown at block 940. In an example, the firmware 224 deallocates the shared resources after each of the selected subset of synchronous I/O commands completes execution. The firmware 224 may continue to select a next subset of synchronous I/O commands for execution from the received synchronous I/O commands.

For example, consider an example scenario in which eight separate operating systems, executing in respective LPARs, each issue a respective synchronous I/O command. Further consider that the shared resources are as illustrated in FIG. 8, where the persistent SCU has four mailboxes per synchronous I/O link. Thus, the limiting resource in this case is the mailboxes. Accordingly, in such an exemplary scenario, the firmware 224 selects four of the received eight synchronous I/O commands. Each of the selected synchronous I/O command is allocated a corresponding mailbox and the predetermined number of DTEs, IOAT table entries, and status pages. Thus, each selected synchronous I/O command is allocated isolated parts of the resources from the shared pool of resources. Accordingly, the four selected synchronous I/O commands are concurrently executable. The remaining four synchronous I/O commands from the received eight commands, may receive a resources not available response from the firmware 224, which may prompt the respective operating systems to retry after a predetermined duration. Alternatively or in addition, the remaining four commands may be queued for further execution, initiated on an alternate link, or selected as in a next subset of synchronous I/O commands for concurrent execution.

Figure 10:
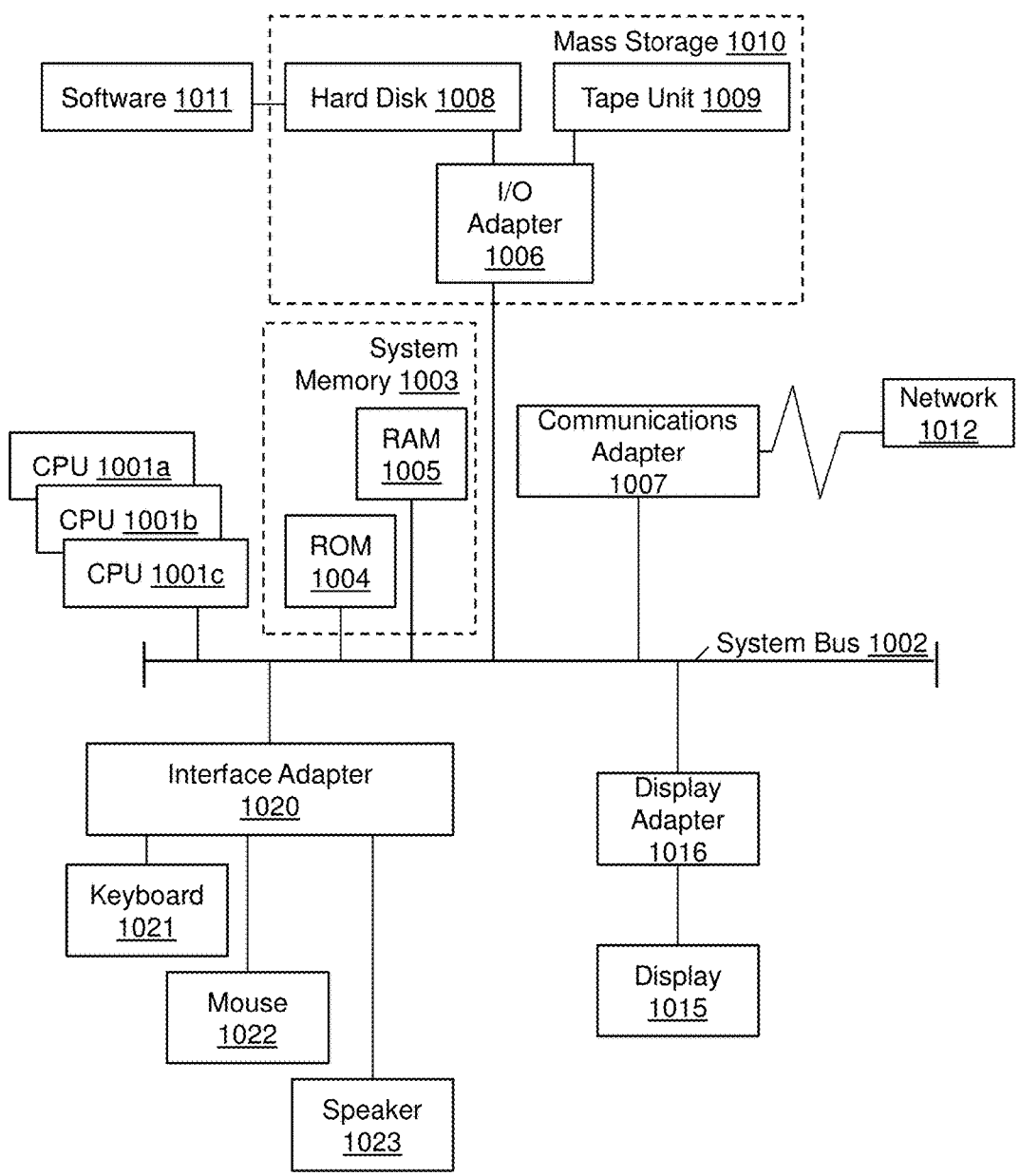
FIG. 10 illustrates a processing system in accordance with an embodiment.

Referring now to FIG. 10, there is shown an embodiment of a processing system 1000 for implementing the technical solutions herein. In this embodiment, the processing system 1000 has one or more central processing units (processors) 1001a, 1001b, 1001c, etc. (collectively or generically referred to as processor(s) 1001). The processors 1001, also referred to as processing circuits, are coupled via a system bus 1002 to system memory 1003 and various other components. The system memory 1003 can include read only memory (ROM) 1004 and random access memory (RAM) 1005. The ROM 1004 is coupled to system bus 1002 and may include a basic input/output system (BIOS), which controls certain basic functions of the processing system 1000. RAM is read-write memory coupled to system bus 1002 for use by processors 1001.

FIG. 10 further depicts an input/output (I/O) adapter 1006 and a network adapter 907 coupled to the system bus 1002. I/O adapter 1006 may be a small computer system interface (SCSI) adapter that communicates with a hard disk 1008 and/or tape storage drive 1009 or any other similar component. I/O adapter 1006, hard disk 1008, and tape storage drive 909 are collectively referred to herein as mass storage 1010. Software 1011 for execution on processing system 1000 may be stored in mass storage 1010. The mass storage 1010 is an example of a tangible storage medium readable by the processors 1001, where the software 1011 is stored as instructions for execution by the processors 1001 to perform a method, such as the process flows as noted above. Network adapter 1007 interconnects system bus 1002 with an outside network 1012 enabling processing system 1000 to communicate with other such systems. A screen (e.g., a display monitor) 1015 is connected to system bus 1002 by display adapter 1016, which may include a graphics controller to improve the performance of graphics intensive applications and a video controller. In one embodiment, adapters 1006, 1007, and 1016 may be connected to one or more I/O buses that are connected to system bus 1002 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 1002 via an interface adapter 1020 and the display adapter 1016. A keyboard 1021, mouse 1022, and speaker 1023 can be interconnected to system bus 1002 via interface adapter 1020, which may include, for example, a Super I/O chip integrating multiple device adapters into a single integrated circuit.

Thus, as configured in FIG. 10, processing system 1000 includes processing capability in the form of processors 1001, and, storage capability including system memory 1003 and mass storage 1010, input means such as keyboard 1021 and mouse 1022, and output capability including speaker 1023 and display 1015. In one embodiment, a portion of system memory 1003 and mass storage 1010 collectively store an OS, such as the z/OS or AIX OS from IBM Corporation, to coordinate the functions of the various components shown in FIG. 10.

Technical effects and benefits of the embodiments herein provide advantages over asynchronous/traditional I/O commands by avoiding overhead of interrupt processing, context switch and un-dispatch/re-dispatch of the unit of work.

For instance, asynchronous/traditional I/O commands include the disadvantage that while waiting on an I/O operation to complete, a processor executes other productive work, causing overhead for un-dispatch and re-dispatch, context switch overhead with the I/O interrupt and the processor cache content change. In contrast, embodiments herein allows multiple synchronous I/O commands to be initiated, thus allowing multiple synchronous I/O operations to begin, while also allowing additional work to be performed before resuming the command to determine when the I/O operation completes. Further, synchronous I/O commands allow an operating system to issue multiple synchronous I/O commands to multiple targets or transfer multiple records to the same or different targets, to achieve parallelism, and thus improved performance over multiple operations.

In another example, traditional enterprise storage attachments, such as Fiber Connection (FICON) and Fibre Channel Protocol (FCP), have multiple protocol layers that require several hardware, firmware and software levels of processing which cause overhead and add latency. In contrast, the synchronous I/O of embodiments herein eliminates many of these layers, thus improving system efficiency while providing the enterprise qualities of service that includes end-to-end data integrity checking, in-band instrumentation and measurements, work load management and continuous availability with predictable and repeatable high performance.

Embodiments described herein provide SAN attached external persistent storage for synchronous access. In addition, embodiments provide the dynamic switching between synchronous I/O and asynchronous I/O access. Shareable external SAN storage typically will have a mix of short and long running I/O operations which can utilized and benefit from this ability to dynamically switch between the synchronous and asynchronous selection. Embodiments also provide a means for notifying software when the data is not available for synchronous access and the dynamic switching to asynchronous access.

Embodiments described herein provide a low-latency protocol for server to SAN storage communication that allows synchronous I/O access with its inherent advantages of avoiding context switches, interruptions and processor cache pollution, while also providing mechanisms for avoiding processor blocking when access times become too great. Mechanisms are described for dynamic notification and selection of synchronous or asynchronous I/O access.

Thus, embodiments described herein are necessarily rooted in processing system to perform proactive operations for efficiently replicating data across multiple storage subsystems in order to provide continuous availability to overcome problems specifically arising in the realm of traditional I/O and storage subsystem failures.

The technical solutions facilitate controlling access to shared resources in both the server and the storage control unit. The shared resources may include physical links, mailboxes in the control unit, address translation, and data protection resources in the server. Further, in order to minimize firmware access times of control structures, the device table entries used for address translation and protection in typical I/O infrastructures may be extended to also serve as data protection (CRC) context and also control unit mailbox access controls. Using the technical solutions described herein, the firmware dynamically allocates parts of the shared resources per I/O operation. The firmware thus facilitates concurrently executing synchronous I/O commands from multiple operating systems, by allocating each command respective parts of the DTE, address translation and protection, CRC computation context based on mailbox access. The allocated portions of the shared resources are dedicated to a single OS instance for the duration of the corresponding I/O command. After completion of the I/O command the resources are freed such that they can be made available for a new I/O operation for any OS with access to the synchronous I/O link. Thus, the technical solutions described herein facilitate dynamically configuring DTEs and IOAT entries for isolation and protection of an individual synchronous I/O operation by managing shared resources in the server, link, and the persistent SCU.

The embodiments herein may be a system, a method, and/or a computer program product at any possible technical detail level of integration. The computer program product may include a computer readable storage medium (or media) having computer readable program instructions thereon for causing a processor to carry out aspects of the embodiments herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments herein.

Aspects of the embodiments herein are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the embodiments herein. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments of the embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for executing a plurality of computer-executable synchronous input/output (I/O) commands in a multiple virtual storage system, the method comprising:
   receiving, by a processor, a set of synchronous I/O commands that comprises a plurality of synchronous I/O commands, each received from a respective operating system from a plurality of operating systems;
   selecting, from the set of synchronous I/O commands, a subset of synchronous I/O commands;
   allocating a shared resource to the subset of synchronous I/O commands; and
   executing, concurrently, each synchronous I/O command from the selected subset of synchronous I/O commands.

2. The computer-implemented method of claim 1, wherein each synchronous I/O command from the selected subset of synchronous I/O commands is associated with a common synchronous I/O link.

3. The computer-implemented method of claim 2, wherein a synchronous I/O command corresponds to a virtual function associated with a logical partition across the common synchronous I/O link.

4. The computer-implemented method of claim 1, wherein the selected subset of synchronous I/O commands includes a first synchronous I/O command from a first operating system and a second synchronous I/O command from a second operating system.

5. The computer-implemented method of claim 1, further comprises deallocating the shared resource from the selected subset of synchronous I/O commands.

6. The computer-implemented method of claim 1, wherein the subset of synchronous I/O commands is selected based on a predetermined number of synchronous I/O commands to be executed concurrently.

7. The computer-implemented method of claim 6, wherein the predetermined number is a number of instances of the shared resource.

8. The computer-implemented method of claim 1, wherein the shared resource is selected from a pool of shared resources consisting of a physical link, a mailbox page, an address translation table, and a device table.

9. A computer program product, the computer program product comprising a computer readable storage medium having program instructions for executing a plurality of computer-executable synchronous input/output (I/O) commands, the program instructions executable by a processor, and the program instructions comprising instructions to:
   receive a set of synchronous I/O commands that comprises the plurality of synchronous I/O commands, each received from a respective operating system from a plurality of operating systems;
   select, from the set of synchronous I/O commands, a subset of synchronous I/O commands, wherein the subset of synchronous I/O commands comprises a predetermined number of synchronous I/O commands to be executed concurrently;
   allocate a shared resource to the subset of synchronous I/O commands; and
   execute, concurrently, each synchronous I/O command from the selected subset of synchronous I/O commands.

10. The computer program product of claim 9, wherein each synchronous I/O command from the selected subset of synchronous I/O commands is associated with a common synchronous I/O link.

11. The computer program product of claim 10, wherein the common synchronous I/O link is a peripheral component interconnect (PCI) link.

12. The computer program product of claim 9, wherein the selected subset of synchronous I/O commands includes a first synchronous I/O command from a first operating system and a second synchronous I/O command from a second operating system.

13. The computer program product of claim 9, wherein the program instructions further comprises instructions to deallocate the shared resource from the selected subset of synchronous I/O commands.

14. The computer program product of claim 9, wherein the shared resource is a resource with the least number of instances from a pool of shared resources.

15. The computer program product of claim 14, wherein the pool of shared resources comprises a synchronous I/O link, a mailbox page, an address translation table, and a device table.

16. A system for managing execution of a plurality of computer-executable synchronous input/output (I/O) commands, the system comprising:
    a memory; and
    a processor communicably coupled with the memory, and the processor configured to:
        receive a set of synchronous I/O commands that comprises the plurality of synchronous I/O commands, each received from a respective operating system from a plurality of operating systems;
        select, from the set of synchronous I/O commands, a subset of synchronous I/O commands, wherein the subset of synchronous I/O commands comprises a predetermined number of synchronous I/O commands to be executed concurrently;
        allocate a shared resource to the subset of synchronous I/O commands; and
        execute, concurrently, each synchronous I/O command from the selected subset of synchronous I/O commands.

17. The system of claim 16, wherein the processor is further configured to select the selected subset of synchronous I/O commands by identifying, from the set of synchronous I/O commands, the synchronous I/O commands that are associated with a common synchronous I/O link.

18. The system of claim 17, wherein identifying a synchronous I/O command is associated with the common synchronous I/O link is based on command parameters.

19. The system of claim 16, wherein the shared resource is a resource with the least number of instances from a pool of shared resources.

20. The system of claim 19, wherein the pool of shared resources comprises a synchronous I/O link, a mailbox page, an address translation table, and a device table.

* * * * *